No. 721,295. PATENTED FEB. 24, 1903.
H. V. GARRETSON.
WATER METER AND BOXING.
APPLICATION FILED SEPT. 2, 1902.
NO MODEL.
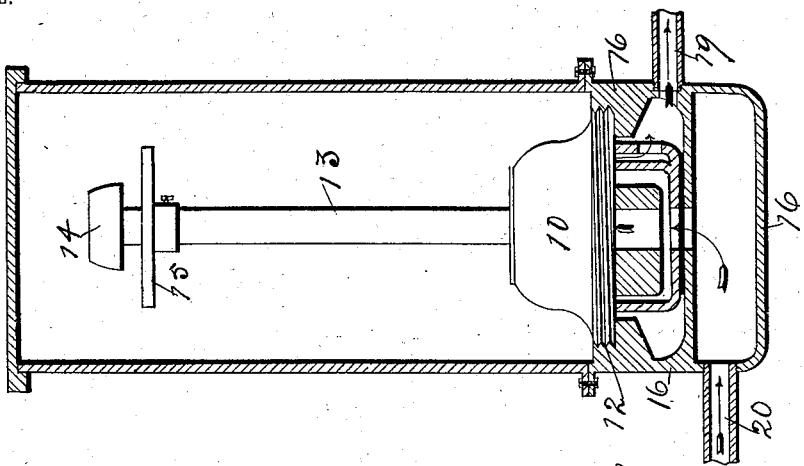
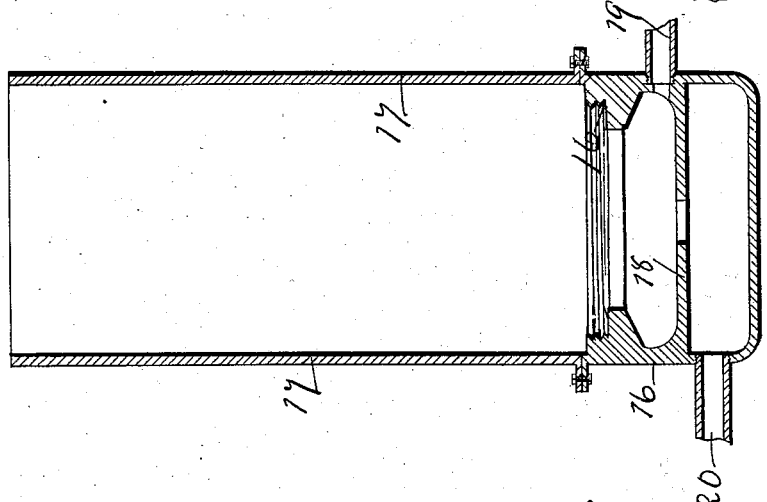
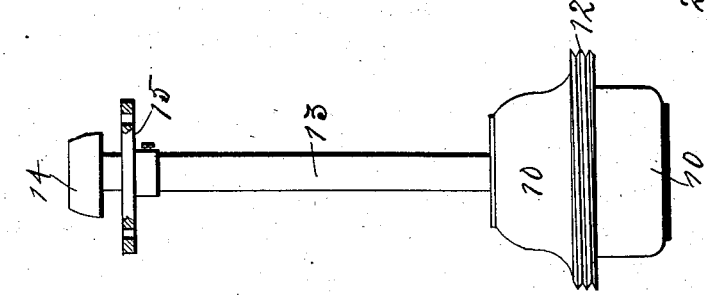
Witnesses:
L. L. Leibrock
R. H. Orwig
Inventor: Homer V. Garretson
By Thomas G. Orwig, Atty.

UNITED STATES PATENT OFFICE.

HOMER V. GARRETSON, OF WORTHINGTON, MINNESOTA.

WATER-METER AND BOXING.

SPECIFICATION forming part of Letters Patent No. 721,295, dated February 24, 1903.

Application filed September 2, 1902. Serial No. 121,858. (No model.)

*To all whom it may concern:*

Be it known that I, HOMER V. GARRETSON, a citizen of the United States, residing at Worthington, in the county of Nobles and State of Minnesota, have invented a new and useful Water-Meter and Boxing, of which the following is a specification.

My object is to construct and combine all the operative parts of a water-meter with a fixed base and boxing and service-pipe connected with the fixed base in the ground in such a manner that the meter-case and wheel therein and all the meter mechanism connected with the meter-case can be jointly lifted in and out of the boxing and connected and disconnected with the fixed base and without the use of any extraneous tool or device by simply rotating the meter-case to fasten and unfasten it and raising and lowering it relative to the base and the boxing, so that the boxing and base can be small in diameter and permanently fixed in the ground and the dial of the meter in the top portion of the boxing visible for inspection whenever the cover is removed.

My invention consists in the construction, arrangement, and combination of parts, as hereinafter set forth, pointed out in my claims, and illustrated in the accompanying drawings, in which—

Figure 1 shows the meter complete and ready to be connected with a case. Fig. 2 is a sectional view of the base and boxing adapted to be fixed in the ground, service-pipe fixed thereto and as required for practical use. Fig. 3 shows the meter detachably connected with the fixed base, boxing, and service-pipe as required to be attached and detached therefrom at pleasure and without the aid of any extraneous tool or device of any kind.

The numeral 10 designates a meter-case provided with a flange 12, that is screw-threaded on its periphery. It is adapted for mounting a rotatable wheel *a* therein and has a port *b* in the center of its tube to admit water and a port in its periphery to discharge water, as indicated by arrows in Fig. 3. A tubular stem 13 is fixed to the top of the meter-case for supporting a dial 14 at its top. A hand-wheel 15 is fixed to the top portion of the stem for rotating the stem and meter-case, as required, in attaching and detaching the meter from the lower end portion of the boxing to which the meter is fitted. The tubular meter-stem and flanged meter-case thus combined can be advantageously handled jointly, as required, to facilitate attaching and detaching the meter from its fixed base at the bottom of the boxing.

A boxing for the meter is composed of a base and screw-seat 16 and a cylinder 17, secured together by flanges and bolts, as shown in Fig. 3. A partition 18 in the base divides the base into upper and lower compartments that have communication through a central opening in its center coinciding with the port *b* in the bottom of the meter-case 10. The upper compartment is adapted for connecting a service-pipe 19 therewith and the lower compartment for connecting a pipe 20, as shown in Fig. 3, and, as required, for establishing communication between the service-pipes, the base 16 of the boxing, and the meter. Suitable packing-rings are placed between the overlying parts of the meter 10 and the base 16, and a removable cover 21 is placed on top of the boxing-cylinder 17.

Having thus described the purpose of my invention and the construction and function and arrangement and combination of all the parts, its practical operation and utility will be readily understood by persons familiar with the art to which it pertains, and

What I claim as new, and desire to secure by Letters Patent, is—

1. A circular meter-case having a screw-threaded flange, an inlet-port at the center of its bottom and an outlet-port at its side below said flange and a fixed tubular stem extending upward from the center of the top of the case to support a dial and a hand-wheel fixed to the top portion of said stem, in combination with a fixed boxing having a fixed base having a screw-seat to operate in the manner set forth for the purposes stated.

2. A circular meter-case having a screw-threaded flange at its central portion, an inlet-port at the center of its bottom and an outlet-port at its side below said flange, a tubular stem extending upward from the center of the top of the case to support a dial and a hand-wheel fixed to the top portion of the stem in combination with a fixed base having a screw-seat and a cylinder fixed to the top of the base, to operate in the manner set forth for the purposes stated.

3. A circular meter-case having a screw-threaded flange, an inlet-port at the center of its bottom and an outlet-port at its side below said flange, a tubular stem extending upward from the center of the top of the case to support a dial and a meter-wheel in the meter-case, in combination with a fixed base having a screw-seat and a cylinder fixed to the top of the base and a hand-wheel fixed to the top portion of the tubular stem, to operate in the manner set forth for the purposes stated.

4. A boxing for a meter consisting of a base that has an internal screw and an external flange at its top for detachably connecting a meter-case therewith, a horizontal partition at its central portion having a port at its center, an inlet-port at its side below the partition and an outlet-port at its side above the partition for connecting pipes therewith and a cylinder having a corresponding flange at its bottom fixed to the flange at the top of the base, as and for the purposes stated.

5. A water-meter and boxing comprising a meter-case having a screw-threaded flange at its central portion, a tubular stem at its top, a hand-wheel fixed to the top portion of said stem, a dial at the top of the stem, a water-wheel mounted in the meter-case, an inlet-port in the bottom of the meter-case, an outlet-port in the side of said case, an inlet-port in the side of said case, a base having an internal screw in its top, a horizontal partition in its central portion, a central port in its bottom, an inlet-port below the partition, an outlet-port above the partition and an exterior flange at its top, a cylinder fixed to said flange and a removable cover on top of the cylinder, arranged and combined to operate in the manner set forth for the purposes stated.

HOMER V. GARRETSON.

Witnesses:
PETER THOMPSON,
FRANK SAXON.